UNITED STATES PATENT OFFICE.

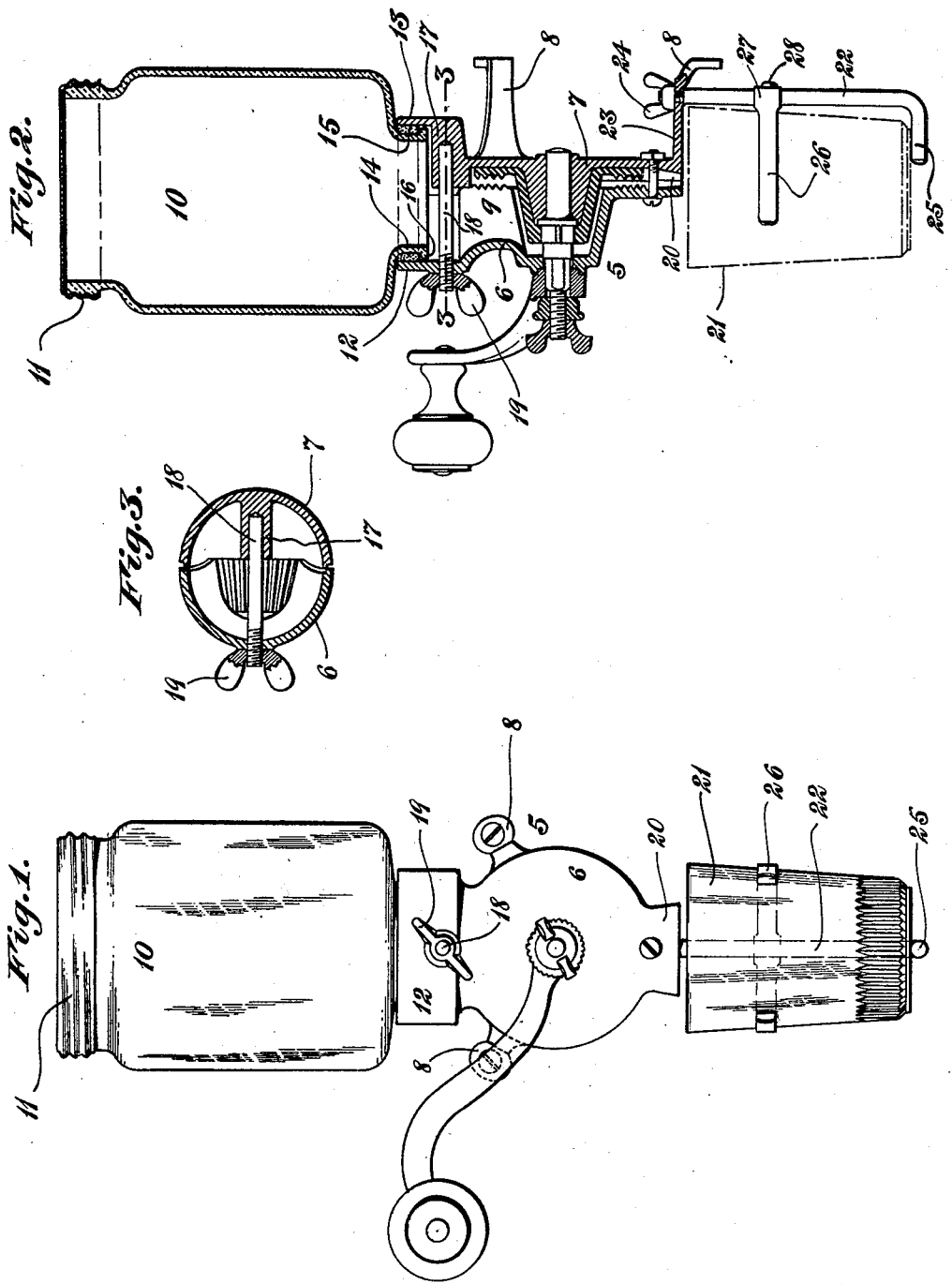

ELI M. WALKER, OF MERIDEN, CONNECTICUT, ASSIGNOR TO THE CHARLES PARKER COMPANY, A CORPORATION OF CONNECTICUT.

COFFEE-MILL.

999,684.

Specification of Letters Patent.

Patented Aug. 1, 1911.

Application filed March 29, 1911. Serial No. 617,551.

*To all whom it may concern:*

Be it known that I, ELI M. WALKER, a citizen of the United States, residing at Meriden, in the county of New Haven and State of Connecticut, have invented certain new and useful Improvements in Coffee-Mills, of which the following is a specification.

This invention relates to coffee mills, and while said invention can be incorporated in mills of any type, it is especially applicable to those involving a canister for receiving the unground coffee and which also have a removable receptacle into which the ground coffee is delivered.

It is a feature of considerable importance to provide for the ready and easy removal of the canister for various purposes; for instance, cleaning, and one of the primary purposes of the invention is to provide simple means for removably holding the canister in place and which is of such construction that said canister can be taken from the mill at any time without fear of disturbing the mill proper or any of its operative parts. I am familiar with a mill having a canister which may be removed, but this operation is one that requires great care to prevent throwing out of operative relation the bur or grinding cone of the mill.

Another object of the invention is to provide an effective means for removably holding the ground coffee receptacle in position to receive the ground coffee from the mill proper.

In the drawings accompanying and forming part of the present specification I have shown in detail one convenient form of embodiment of the invention, which to enable those skilled in the art to practice the same will be set forth fully in the following description, while the novelty of the invention will be included in the claims succeeding said description. From this it will be apparent that I do not restrict myself to the disclosure made by said drawings and description. I may depart therefrom in several respects within the scope of my invention included in said claims.

I desire to call attention to another point. I provide as hereinbefore intimated separate means for removably holding the canister, and ground coffee receptacle in place. It is not necessary that both of these be used in one mill.

Referring to said drawings: Figure 1 is a front elevation of a coffee mill including my invention. Fig. 2 is a vertical section of the same. Fig. 3 is a horizontal section on the line 3—3 of Fig. 2.

Like characters refer to like parts throughout the several figures.

The mill includes in its construction a casing such as that denoted in a general way by 5, and while said casing may be of any suitable nature, it is represented as consisting of front and rear sections 6 and 7 respectively, the rear section 7 being shown provided with rearwardly extending arms or projections 8 by which the mill can be attached to a suitable support.

Within the casing 5 or mounted between the sections 6 and 7 thereof is the grinding mechanism denoted in a general way by 9. This grinding mechanism is or may be of the usual construction, for which reason it is not necessary for me to describe the same in detail.

The casing 5 preferably supports a canister for the unground coffee, and a canister such as meets the desired conditions is that denoted in a general way by 10 and which may be of glass as usual and provided with a removable screw cap 11 which may be removed to introduce the coffee into the canister. Any other kind of canister would, of course, answer. Preferably the canister is removably clamped between the sections 6 and 7 which are shown provided at their upper ends with semi-circular flanges 12 and 13 respectively, which surround or inclose the depending neck 14 of the canister 10. Said neck 14 is shown surrounded by a gasket 15 which may consist of rubber or equivalent material and which finds a bearing against the external annular bead 16 at the lower end of said neck, said gasket 15 having a contact with the inner surfaces of the mating flanges 12 and 13, the terminals of which are contiguous. These two flanges 12 and 13 in the present case are clamped about the neck of the canister, the rubber gasket or washer being interposed between the parts so as to protect the canister from injury. In case the canister were not of frangible material, it would not be necessary to use this interposed packing.

The rear section 7 of the casing 5 is shown provided on its inner face below the flange 13 with an enlargement 17 which is bored to receive the bolt or pin 18. This bolt or pin is tightly driven into the bore, or the connection might be a screw threaded one. This is not an essential matter, as there are other ways with which said bolt or pin could be connected with the rear section. As a matter of fact it is not essential that the said pin be connected with the rear section, although this is desirable in that the clamping member connected with the said bolt or pin is accessible from the front of the machine. The clamping member associated with said bolt or pin is represented as consisting of a nut 19 of winged form, and I should state that said bolt or pin extends through a perforation or hole in the front section 6, the said nut being threaded on the said bolt exteriorly of the casing and being adapted when set up, to engage the front face of the said forward section 6.

The construction described is an exceedingly simple and effective one for clamping the canister in place. To remove the canister it is simply necessary to slightly unscrew the nut at which point the sections 6 and 7 will release the canister sufficiently to permit it to be readily and easily lifted from place at which time it can be cleaned. It is an equally simple matter to reintroduce the canister. When its neck is seated between the flanges, the nut 19 can be again set up so as cause the two flanges to clamp the neck in place.

I am familiar with a certain type of mill wherein there are front and rear sections which receive between them the neck of a canister, these sections being held together by screws and nuts at opposite sides of the machine. Before the canister can be removed it is necessary in this old machine to take off both nuts, and when this is done the front section of the casing falls away from the rear section thereof and the members of the grinding mechanism become displaced. The mills come into the hands of women as a rule, and it has been found in practice that when one of the mills of the old type becomes disorganized, from the condition pointed out, it is sent back to the factory for repairs. I eliminate all these troubles and provide at any time for the ready removal of the canister which is a great desideratum, without disarranging or throwing out of operative relation any parts of the casing or of the mill or grinding mechanism. The casing 5 is shown having a discharge outlet or delivery orifice 20 for the ground coffee which passes into a receptacle as 21 and which may be an ordinary glass. I provide means for detachably and securely holding the ground coffee receptacle in position to receive the ground coffee discharged through said outlet 20, and a carrier such as 22 meets the desired conditions, said carrier being represented as consisting of a rod supported by the rearwardly extending arm 23 carried by the rear section 7 of the casing 5. The said carrier or rod 22 may as shown extend through a perforation in said arm 23 and may be held in place by a nut 24 in threaded connection with the upper end of said carrier or rod. The carrier or rod 22 is shown provided at its lower end with a forward projection or bend 25 which can not only sustain the ground coffee receptacle or glass 21 but which can also act as a guide to properly direct the tumbler between the arms of a clip for yieldingly engaging the said ground coffee receptacle or tumbler. The clip for thus engaging the ground coffee receptacle 21 may vary as to structure, although I have found one denoted in a general way by 26 and comprising a pair of complemental spring arms as satisfactory in this connection, the free ends of the arms being slightly outwardly deflected so as not to prevent the free movement of the receptacle 21 therebetween. The said spring arms or branches of the clip are preferably, though not necessarily, made integral being formed in one piece with the substantially U-shaped body 27 which embraces the carrier or rod 22 between its ends and which is held firmly in place to said carrier or rod in any suitable way, for example by a screw 28.

The arms or spring branches of the clip positively and effectually hold the tumbler in position to receive the ground coffee discharged through the outlet 20, although it is a simple matter to remove the said receptacle by a pull thereupon. It will be clear that I rely on the said clip to thus maintain the ground coffee receptacle in operative position. While the auxiliary support as it might be termed, or projection 25 aids in supporting the tumbler, its presence is not altogether necessary, and in fact may be dispensed with and the clip altogether relied upon to properly position the tumbler. As intimated the projection 25 acts as a guide to insure the proper placing of the tumbler and for this reason also its presence is advantageous. I desire to call attention to the fact that the carrier 22 is removably mounted, and it is clear that this carrier can be readily separated from the mill casing 5 which is of importance during storage or shipment in that said carrier at such times can be placed within the canister or equivalent receiver 10. The simplicity of the clamping nut 19 and its associated parts is obvious. The bolt 18 is practically wholly inclosed by the casing where it is out of the way. This bolt in the present instance extends diametrically of the canister seat presented jointly by the flanges 12 and 13 and is located approximately about centrally of the casing 5 laterally thereof.

By virtue of the construction already described it is only necessary for me to provide as illustrated in Figs. 1 and 2 a single bolt and nut to hold the parts of the casing in assembled relation. This bolt and nut is preferably located near the lower part of the casing and in this manner I can utilize the natural resiliency of the forward section 6 to slightly spring away from the companion section 7 when the nut 19 is backed off. Of course, this construction is not essential, although it is desirable. The mating flanges 12 and 13, as already indicated, jointly clamp the pendent portion of the canister 10 and they present interiorly a cylindrical seat for the canister neck, and owing to this construction, it is necessary to back off the nut 19 to a very small extent when the canister 10 can be lifted from place.

What I claim is:

1. A coffee mill comprising a casing in sections, each section having a flange, a canister provided with a pendent portion embraced by said flanges, a bolt disposed substantially midway of the width of the casing, extending from front to rear thereof, said bolt being associated with one of the sections, the other section having an opening for the passage of the bolt, and a clamping member for the sections connected with the bolt exteriorly of the casing.

2. A coffee mill comprising a casing in sections, each section having a flange of substantially semi-circular form, a canister having a pendent neck embraced by the flanges, a bolt disposed substantially midway of the width of the casing, extending from front to rear thereof, said bolt being rigidly connected with the rear section of the casing, the front section having an opening for the passage of said bolt, and a nut threaded onto the extended end of the bolt for clamping the said flanges around said neck.

3. A coffee mill comprising a casing in sections, each section having a flange, a canister provided with a pendent portion embraced by said flanges, a single bolt extending from front to rear of said casing between the sides thereof, said bolt being associated with one of said sections, the other section having an opening for the passage of said bolt, and a clamping member for the sections connected with said bolt exteriorly of the casing.

In testimony whereof I affix my signature in presence of two witnesses.

ELI M. WALKER.

Witnesses:
JAS. R. SLOANE,
W. P. ZIEGLER.

---

Copies of this patent may be obtained for five cents each, by addressing the "Commissioner of Patents, Washington, D. C."